US007303125B2

(12) United States Patent
Lin et al.

(10) Patent No.: US 7,303,125 B2
(45) Date of Patent: Dec. 4, 2007

(54) APPARATUS AND METHOD OF AUTOMATICALLY COUNTING A CARRIER TAPE

(75) Inventors: Yuan-Chi Lin, Hsin-Chu (TW); Bob Huang, Hsin-Chu (TW)

(73) Assignee: King Yuan Electronics Co., Ltd., Hsin-Chu (TW)

( * ) Notice: Subject to any disclaimer, the term of this patent is extended or adjusted under 35 U.S.C. 154(b) by 251 days.

(21) Appl. No.: 11/233,588

(22) Filed: Sep. 22, 2005

(65) Prior Publication Data

US 2007/0040012 A1 Feb. 22, 2007

(30) Foreign Application Priority Data

Aug. 19, 2005 (TW) .............................. 94128332 A

(51) Int. Cl.
*G06K 7/00* (2006.01)

(52) U.S. Cl. ...................... 235/439; 235/103; 235/454; 235/479

(58) Field of Classification Search ................ 235/376, 235/103, 384, 439, 479
See application file for complete search history.

(56) References Cited

U.S. PATENT DOCUMENTS 4,972,068 A * 11/1990 Ohtani et al. ............... 235/375
6,793,139 B2 * 9/2004 Frich .......................... 235/475

* cited by examiner

*Primary Examiner*—Seung Ho Lee
(74) *Attorney, Agent, or Firm*—Birch, Stewart, Kolasch & Birch, LLP

(57) ABSTRACT

The present invention is directed to apparatus and method of automatically counting the loaded electronic components in a carrier tape. A pair of detectors is arranged respectively above and below the carrier tape, and a counting wheel having teeth on the periphery is operatively coupled to the keyholes of the tape and reel machine. An encoder is utilized having its axis coupled to the counting wheel.

13 Claims, 2 Drawing Sheets

APPARATUS AND METHOD OF AUTOMATICALLY COUNTING A CARRIER TAPE

BACKGROUND OF THE INVENTION

1. Field of the Invention

The present invention relates generally to a counting apparatus for carrier tape, and more particularly to a two-way counting apparatus for carrier tape.

2. Description of the Prior Art

It has become common in the industry to package tested integrated circuits (ICs) in carrier tape, which is characterized by a flexible strip of plastic with pockets formed at regular intervals along its length, so as to the ICs can be handled or picked-up easily. In this method, the ICs are loaded and counted by automatic apparatus. FIG. 1A shows a part view of automatic counting apparatus for the carrier tape. A carrier tape 10 includes component pockets 11 for loading and carrying the qualified ICs. Each of the pocket 11 includes a hole 12 located in mid of its bottom, and the hole 12 is thus usually named as mid-hole. Take an upward view from beneath the carrier tape 10, there is a space 14 presented between two adjacent pockets 11.

A pair of detectors 15A is installed above and under the carrier tape 10, and the other detectors 15B is provided on the left and right side. Each pair of detectors includes an emitter (such as infrared ray emitter) and a sensor. The detectors 15A are utilized for detecting the position of the hole 12, and the detectors 15B record the start position of next loading by sensing the position of the end of the space 14.

"Solid" (loaded with one IC in the pocket) or "Null" (without loaded IC in the pocket) can be detected by the detectors 15A of conventional automatic counter, as shown in FIG. 1B. If the error loading was detected, for example a Null was detected in one pocket that it should be Solid therein, the operator would pause the counter, rewinding the tape for an amount, loading with one IC in the pocket, restarting the tape and reel machine and the counter so as to the number of loaded ICs can be counted again. However, the counter counts incrementally as the carrier tape advancing a predetermined amount, but it cannot count decreasingly as the carrier tape reversing, and consequently the final counting result would be wrong.

Therefore, it would be advantageous to have a novel apparatus that allows for counting of inventory in two-ways on a tape and reel machine and allows for recording the position of tape precisely.

SUMMARY OF THE INVENTION

In view of the foregoing, it is one objective of the present invention to provide an apparatus for counting of inventory in two-ways on a tape and reel machine and allows for recording the position of tape precisely.

According to the object, the present invention provides an automatic counting apparatus on a tape and reel machine. It includes a pair of detectors that is above and under the tape respectively. A counting wheel has teeth at regular pitches around its periphery for engaging keyholes, which provided also at regular pitches along the carrier tape for supplying a driving force to rotate the counting wheel while the tape is moving whatever it is forward or backward. Furthermore, an encoder is utilized with its axis coupling to the counting wheel, therefore the counter of the present invention can count in two-ways.

According to one embodiment of the present invention, a tape feeder includes two motors supplying the driving forces to advance/rewind the carrier tape. A counting wheel is provided for engaging to the keyhole of the tape, and an encoder is coupled to its axis, so that the number of loaded ICs could be counted and the position of pocket could be recorded precisely as well. The counting wheel starts to count while the mid-hole is detected, and it can count in two-ways no matter the tape is moved forward or backward. If loading error is detected, the operator would pause the tap feeder; rewind the tape to the pocket that is loaded erroneously, loading or unloading the IC according to actual demand, then restart the tape feeder. As the counting wheel can count in two-ways, so that the number of loaded IC could be counted correctly even the loading error has encountered.

The above as well as additional features and advantages of the present invention will become apparent in the following detailed written description.

DESCRIPTION OF THE PREFERRED EMBODIMENT

The detailed description of the present invention will be discussed in the following embodiment, which is not intended to limit the scope of the present invention, but can be adapted for other applications. While drawings are illustrated in details, it is appreciated that the quantity of the disclosed components may be greater or less than that disclosed, except expressly restricting the amount of the components.

Figure 1A:
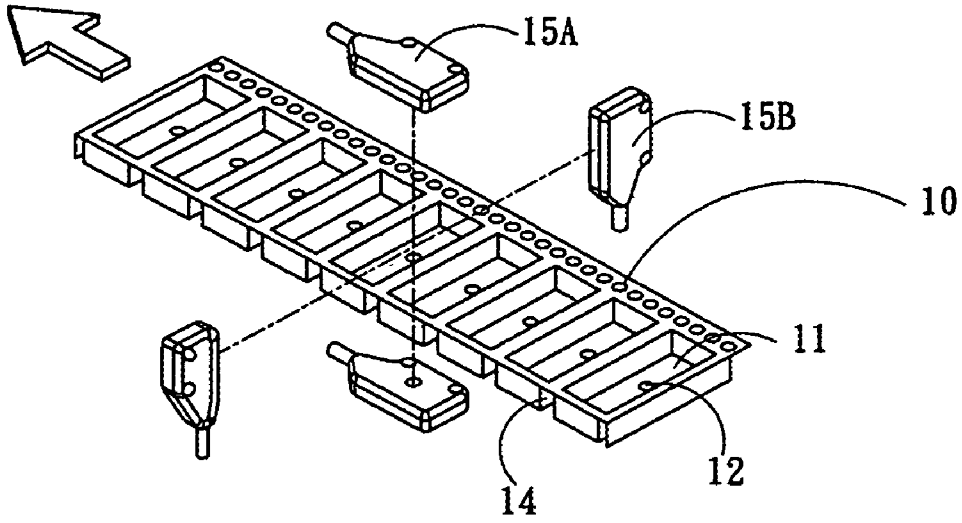
FIG. 1A(Prior Art)
FIG. 1A and FIG. 1B are front views of conventional counting apparatus of tape and reel machine.
Figure 1B:
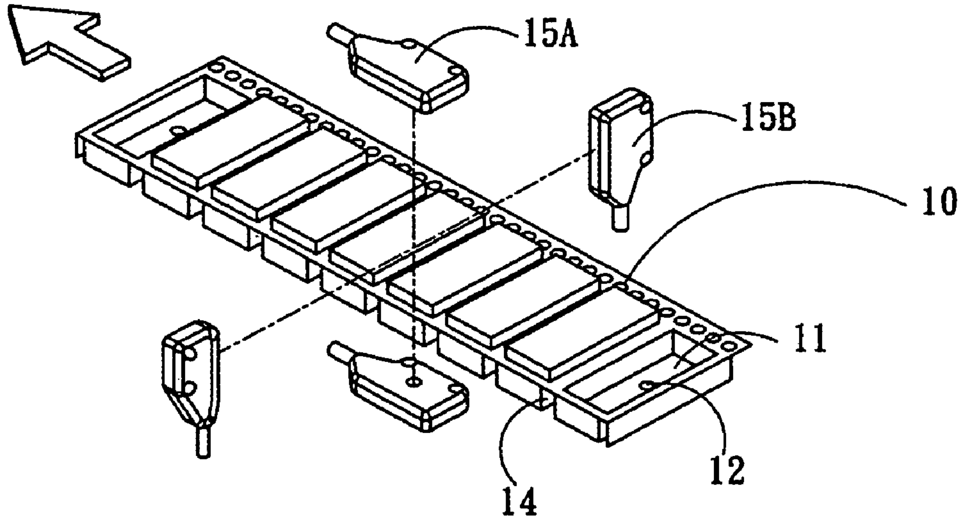
FIG. 1B(Prior Art)
Figure 2A:
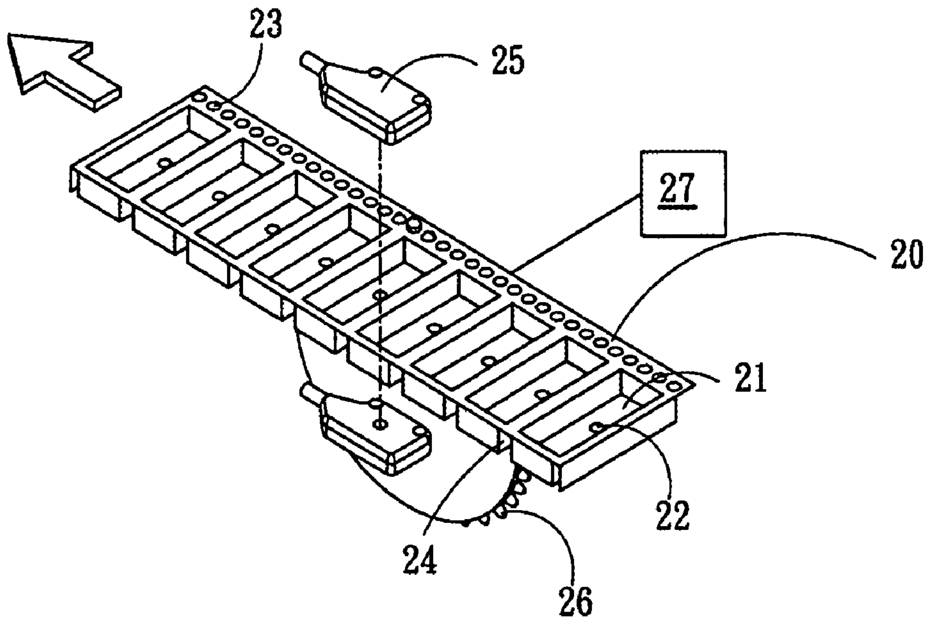
FIG. 2A and FIG. 2B are front views of automatic counting apparatus according to one embodiment of the present invention.

FIG. 2A schematically illustrates a front view of automatic counting apparatus according to one embodiment of the present invention. Carrier tape 20 includes component pocket 21, which is employed for loading and carrying the qualified ICs. In general, one carrier tape 20 includes hundreds or thousands pockets 21 and only parts of them have shown in this illustration. The pocket 21 includes a hole 22 located in mid of its bottom and is also usually named as mid hole. Perforated edge includes keyholes 23, whose function will be described in the following paragraph. Take an upward view from beneath the carrier tape 20, there is a space 24 presented between two adjacent pockets 21. The space 24 is not an essential element in the present invention, though it is employed in this preferred embodiment, and it is possible that no space 24 exists in other embodiment according to the present invention.

A pair of detectors 25 consisting of an emitter (such as infrared ray emitter) and a sensor are provided above and under the carrier tape 20, and it can be implemented in a number of ways in a preferred embodiment of the present invention. The emitter, mid-hole 22 and sensor are arranged in a row. The light (visible and invisible) emitted by emitter passes through the mid-hole 22 and received by the sensor. The fixtures, which fit the detectors, are not shown in the figure for illustration purposes. As the carrier tape 20 being moved, the circuit in interior of the detector 25 will be actuated to the on state if the light is received by the sensor; and the circuit will stay on the off state if the light did not received by the sensor. The on state means none of the ICs is loaded in the pocket 21, called "Null"; the off state means one IC has loaded in the pocket 21, called "Solid". The circuit will also remain off state if the emitter, mid-hole 22 and sensor not arranged in a row. Please note that the detectors is above and under the carrier tape 20 in this embodiment of the present invention, but both emitter and sensor could be mounted in the same side of the tape in other embodiments of the present invention. In such case the sensor will not receive the light if the mid-hole is available and thus causing the off state; and the sensor will receive the light reflect from IC or tape if one IC has been loaded and thus causing the on state.

A counting wheel 26 located under the keyholes 23 has teeth at regular pitches around its periphery for engaging keyholes 23, which provided also at regular pitches along the carrier tape for supplying a driving force to rotate the counting wheel while the tape is moving. It is necessary to prepare many kinds of carrier tapes 26 because there are various types of ICs having different sizes, and therefore it is necessary to prepare many kinds of counting wheel 26 according to the widths of the tapes and the pitches along the tapes, consequently the rotate speed of the counting wheel will be the same as the advancing speed of the tape. The driving forces for moving the carrier tape 20 may be supplied by at least one motor, in generally one input motor and one output motor for feeding and receiving the tape respectively, there are not shown in the figure for simply diagramed purpose, and the moving direction of tape is represented by an arrow.

According to one embodiment of the present invention, an encoder 27 is utilized having its axis or spindle coupled to the counting wheel 26. It is capable of detecting an absolute position and detecting a rotational displacement of teeth on the counting wheel. There are kinds of form of encoder could be selected. The motor is capable of controlling a rotation speed and an amount of rotation, thereby controlling the advancing speed and a stop position during the intermittent advancement of the carrier tape. The motor drives the carrier tape 26, then the tape drives the counting wheel by using keyholes 26 to engage teeth, and the encoder 27 detects the position of tape, therefore the position of the pocket can be recorded. The position of the pocket 21 can be detected no matter it is "Null" or "Solid", furthermore, because the encoder 27 is capable of counting in two-ways, so that it can record the position precisely even though the operator rewind the carrier tape.

Figure 2B:
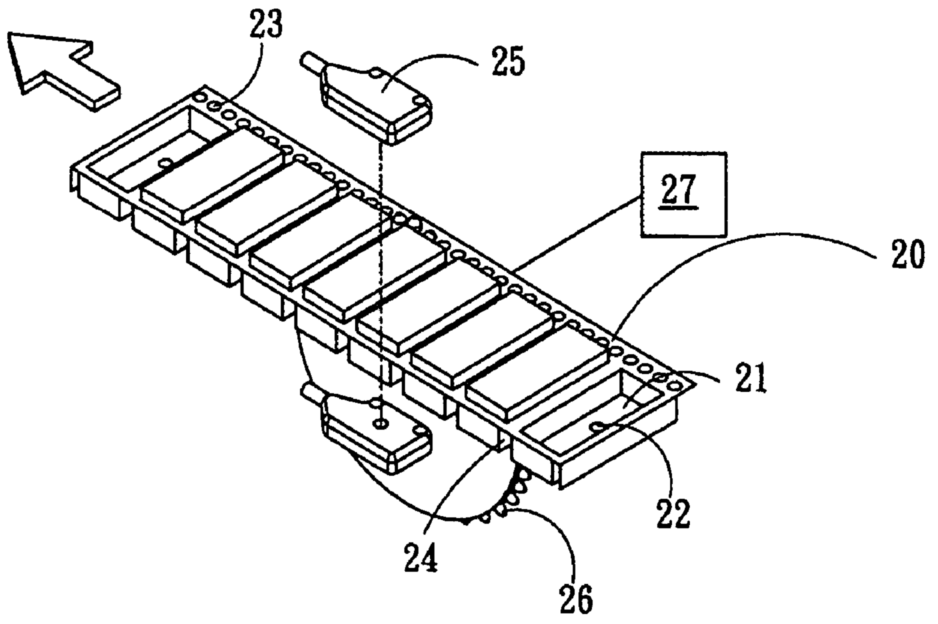

In general, there are a few null pockets allocated in the start and end of the carrier tape 20 before and after the loading process, and the rest part of tape will load the qualified and packaged ICs. The carrier tape 20 set in tape feeder is driven by the input motor, and then the carrier tape 20 is engaged to the counting wheel 26 by using keyholes to engage teeth. The counting will start while the detector aims at the mid-hole. FIG. 2B illustrates the some "Null" pocket and some "Solid" pocket in the same carrier tape 20.

If any loading error such as the number of "Null" of remained pocket is not correct, or the counting of the number of "Solid" becomes wrong, or "Null" has detected with one pocket that it should be "Solid", then the operator will stop the motor, rewinding the carrier tape 20 for an amount, and doing some correcting action such as loading the IC or unloading the IC. Because the automatic counter according to one embodiment of the present invention can counter in two-ways, so that it is capable of counting correct while the operator rewinding the tape and reel machine 20 and loading/unloading IC, and consequently the final counting result will be correct.

Although specific embodiment have been illustrated and described, it will be appreciated by those skilled in the art that various modifications may be made without departing from the scope of the present invention, which is intended to be limited solely by the appended claims.

What is claimed is:

1. An automatic counting apparatus for counting loaded electronic components in a carrier tape, which includes component pockets for loading the electronic components, a row of keyholes at an perforated edge, a hole located in the bottom of the pocket, comprising:
- a detector for detecting the hole of the carrier tape;
- a counting wheel, which would be rotated when the carrier tape moves forward or backward; and
- an encoder coupled to said counting wheel for counting in two-ways.

2. The automatic counting apparatus according to claim 1, wherein said detector includes an emitter and a sensor.

3. The automatic counting apparatus according to claim 1, further comprising at least a motor, for driving said carrier tape.

4. The automatic counting apparatus according to claim 3, wherein said motors include one input motor and one output motor.

5. The automatic counting apparatus according to claim 1, wherein said encoder includes a spindle for connecting with said counting wheel.

6. An automatic counting apparatus for counting loaded electronic components in a carrier tape, which includes component pockets for loading the electronic components, a row of keyholes at an perforated edge, a mid-hole located in the mid of the bottom of the pocket, comprising:
- a pair of detectors located above and under said carrier tape respectively;
- a counting wheel having teeth at regular pitches around its periphery for engaging the keyholes which supply a driving force to rotate the counting wheel while said carrier tape is moved; and
- an encoder coupled to said counting wheel for counting in two-ways.

7. The automatic counting apparatus according to claim 6, wherein said detectors includes an infrared ray emitter.

8. The automatic counting apparatus according to claim 6, further comprising at least a motor, for driving said carrier tape.

9. The automatic counting apparatus according to claim 8, wherein said motors include one input motor and one output motor.

10. The automatic counting apparatus according to claim 6, wherein said encoder includes a spindle for connecting to said counting wheel.

11. A method for counting loaded electronic components in a carrier tape, which includes component pockets for loading electronic components, a row of keyholes at an perforated edge, a mid-hole located in the mid of the bottom of the pocket, and a few null pockets have been allocated in the start and end of the carrier tape, comprising:
- setting the carrier tape in a motor;
- engaging the carrier tape to a counting wheel;
- detecting the mid-hole by a pair of detectors, the automatic counting will start while the mid-hole is detected;
- coupling said counting wheel to a spindle of an encoder, which is provided for counting the position of the carrier tape and it is capable of counting in two-ways;

when loading erroneously with said pocket is detected by the detectors, pausing the counting;

rewinding the carrier tape for an amount and taking correcting action; and continuing the counting till the end of the carrier tape.

12. The method according to claim 11, wherein said detectors include a light emitter and a light sensor.

13. The method according to claim 11, wherein said motors include one input motor and one output motor.

* * * * *